United States Patent [19]

Berger et al.

[11] Patent Number: 5,032,662
[45] Date of Patent: Jul. 16, 1991

[54] METHOD FOR DEFOAMING AQUEOUS DISPERSIONS OF POLYMERIC ORGANIC SUBSTANCES BY ADDITION OF POLYOXYALKYLENE-POLYSILOXANE BLOCK COPOLYMERS

[75] Inventors: Roland Berger, Bochum; Hans-Ferdi Fink; Otto Klocker, both of Essen; Roland Sucker, Werne, all of Fed. Rep. of Germany

[73] Assignee: Th. Goldschmidt AG

[21] Appl. No.: 309,314

[22] Filed: Feb. 10, 1989

[30] Foreign Application Priority Data

Mar. 5, 1988 [DE] Fed. Rep. of Germany ....... 3807247

[51] Int. Cl.$^5$ .............................................. C08G 77/04
[52] U.S. Cl. ........................................ 528/25; 528/29; 556/445; 556/446
[58] Field of Search ................... 556/445, 446; 528/25, 528/29

[56] References Cited

U.S. PATENT DOCUMENTS

| | | | |
|---|---|---|---|
| 3,600,418 | 8/1971 | Bailey et al. | 556/446 |
| 3,629,310 | 12/1971 | Bailey et al. | 556/446 |
| 4,028,218 | 6/1977 | Fink et al. | 252/321 |

*Primary Examiner*—Melvyn I. Marquis
*Attorney, Agent, or Firm*—Toren, McGeady & Associates

[57] ABSTRACT

Polyoxyalkylene-polysiloxane block copolymers are disclosed which exhibit an outstanding defoaming action and have the special advantage of not causing wetting defects when dispersions defoamed therewith are applied on a 2-dimensional substrate. Dispersions of polymeric organic substances, especially dispersions of vehicles, coating agents and adhesives are defoamed by the addition of 0.01 to 2.0% by weight, based on the dispersion to be defoamed, of a polyoxyalkylene-polysiloxane block copolymer of the formula, $$R^1O-A-[B-A-]_m R^1$$

wherein
A is a polyoxyalkylene block with the average formula $C_nH_{2n}O-)y$, in which n has a value of 2.8 to 4.0 and y a value of 15 to 100,
B is a polysiloxane block of the average formula,

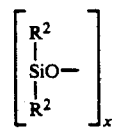

wherein the $R^2$ groups are the same or different and represent an alkyl group with 1 to 4 carbon atoms or a phenyl group, with the proviso that at least 90% of the $R^2$ groups are methyl groups and x has a value of 10 to 100,
$R^1$ groups are the same or different and represent a hydrogen atom or an alkyl group with 1 to 4 carbon atoms and
m has a value of 4 to 20.

8 Claims, No Drawings

METHOD FOR DEFOAMING AQUEOUS DISPERSIONS OF POLYMERIC ORGANIC SUBSTANCES BY ADDITION OF POLYOXYALKYLENE-POLYSILOXANE BLOCK COPOLYMERS

BACKGROUND OF THE INVENTION

This invention concerns silicone oils useful as defoaming agents and more particularly to polyoxyalkylene-polysiloxane block copolymers useful for defoaming aqueous dispersions of organic substances and to a method of defoaming therewith.

The use of silicone oils, especially methylpolysiloxanes of low to moderate viscosity, for defoaming aqueous solutions or dispersions is well known and described, for example in Chemie und Technologie der Silicone (Chemistry and Technology of the Silicones) by W. Noll, 1968, page 540 ff.

The improvement in the defoaming action of organocarbon or organosilicon defoamers by the addition of highly disperse inorganic or organic substances, especially of highly disperse usually pyrogenically produced silica and highly disperse aluminum oxide is also known from the literature and mentioned, for example, in German Patent 1,067,003 and German Offenlegungsschrift 1,914,684.

The use of polyoxyalkylene-polysiloxane block copolymers as defoaming agents is also well known. For example, it is stated in the German Patent 1,012,602 that water soluble block copolymers of the general formula,

wherein R' and R" represent monovalent hydrocarbons or hydrocarbon groups, y is a whole number of at least 2, n is a whole number from 2 to 4, x is at least 5, and the sum of a and b is equal to 2 or 3, can be used as antifoaming agents. The polyoxyalkylene-polysiloxane block copolymers described in the German Patent 1,012,602 may have the structure A'B'A', wherein A' represents the polyoxyalkylene blocks and B' a polysiloxane block.

At a later time it was recognized that the defoaming action of polyoxyalkylene-polysiloxane block copolymers of this type can be improved significantly by making the block copolymers water insoluble.

In German Offenlegungsschrift 2,442,853, a preparation for defoaming aqueous solutions or dispersions is described which comprises: 0.2 to 7.5% by weight of highly disperse silica or highly disperse aluminum oxide and 92.5 to 99.8% by weight of a methylpolysiloxane-polyoxyalkylene block copolymer, which contains 10 to 60% by weight of methylpolysiloxane and the polyoxyalkylene block which has more than 80% and up to 100% by weight of oxypropylene units.

The polyoxyalkylene-polysiloxane block copolymers, described in greater detail in this German Offenlegungsschrift, may also have the A'B'A' structure.

In U.S. Pat. No. 4,028,218 a method is disclosed for preventing or destroying foam in aqueous solutions or dispersions, wherein a preparation similar to that disclosed in German Offenlegungsschrift 2,443,853 is used. The preparation differs essentially in that it contains additionally an organic oil, which also has a defoaming action. Suitable organic oils are esters of alcohols and fatty acids, such as vegetable, animal or mineral oils, polybutadiene oils or polypropylene glycols.

As does U.S. Pat. No. 4,028,218, German Offenlegungsschrift 3,123,103 discloses the use of a mineral oxide-free mixture of A) 1–20% by weight of at least one polydimethylsiloxane-polyoxyalkylene block copolymer, which comprises to the extent of 10 to 60% and preferably 15 to 40% by weight of methylsiloxane units and to the extent of 90 to 40% and preferably 85 to 60% by weight of oxyalkylene units, the oxyalkylene units comprising 75 to 100% of oxypropylene units and 0 to 25% of oxyethylene units, B) 99–80% by weight of at least one neutral carboxylic acid ester of a saturated or unsaturated, linear or branched, monocarboxylic or dicarboxylic acid having 4 to 12 carbon atoms and a branched monohydric alcohol having 4 to 12 carbon atoms, as defoamers in aqueous dispersions in synthetic resins.

The polyoxyalkylene-polysiloxane block copolymers, contained in an amount of 1 to 20% by weight in the mixture, may have the structure $A'\text{-}[B'\text{-}A']_z$, with the proviso that z has a value of 1 to 3.

The silicone oils or preparations containing polyoxyalkylene-polysiloxane block copolymers, which are known from the art, are suitable, to a more or less pronounced extent, for preventing the formation of foam in aqueous solutions or aqueous dispersions of organic substance and to destroy foam already formed. It has turned out however, that aqueous dispersions of polymeric organic substances treated with such preparations have disadvantages when used, which are attributed to the addition of these defoaming agents. More particularly, it has been found that dispersions of vehicles, coating agents and adhesives, to which polysiloxanes or polyoxyalkylene-polysiloxane block copolymers have been added for the purpose of defoaming, have wetting defects when applied on surfaces. These wetting defects, which occur especially with aqueous dispersions of polyurethanes, are revealed by an irregular wetting of the substrate and lead to the formation of coatings of irregular thickness and, in the limiting case, to coatings, which have defects of different size.

SUMMARY OF THE INVENTION

It is an object of the present invention to provide suitable polyoxyalkylene-polysiloxane block copolymers which have a good defoaming effect in aqueous dispersions of polymeric organic substances, especially in dispersions of vehicles, coating agents and adhesives, without causing any wetting defects when these dispersions are applied on a surface.

This objective is accomplished by the discovery of a new defoaming composition comprised of a polyoxyalkylene-polysiloxane block copolymer of the formula,

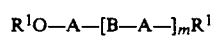

wherein

A is a polyoxyalkylene block with the average formula $(C_nH_{2n}O\text{---})_y$, in which n has a value of 2.8 to 4.0 and y a value of 15 to 100, B is a polysiloxane block of the average formula

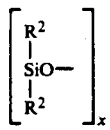

wherein the $R^2$ groups are the same or different and represent an alkyl group of 1 to 4 carbon atoms or a phenyl group, with the proviso that at least 90% of the $R^2$ groups are methyl groups and x has a value of 10 to 100, $R^1$ groups are the same or different and represent a hydrogen atom or an alkyl group of 1 to 4 carbon atoms and m has a value of 4 to 20.

According to the invention, the polyoxyalkylene-polysiloxane block copolymer is added to a dispersion to be defoamed in an amount of 0.01 to 2.0% by weight, based on the dispersion.

DESCRIPTION OF THE INVENTION

In the defoaming composition of the invention, the polyoxyalkylene block A corresponds to the average formula $(C_nH_{2n}O-)_y$, in which n has a value of 2.8 to 4.0. This value of n arises from the simultaneous presence of oxyethylene, oxypropylene and/or oxybutylene units. The numerical value of 2.8 corresponds to a polyoxyalkylene block which is composed of up to 20 mole percent of oxyethylene units and 80 mole percent of oxypropylene units. However, this value also corresponds to a polyethylene block A having suitable amounts of oxyethylene and oxypropylene or oxyethylene, oxypropylene and oxybutylene units. If n has a value of 4.0, the polyoxyalkylene block consists only of oxybutylene units. Preferably, n has an average value of 2.8 to 3.5.

Different oxyalkylene units, wherein n=2, 3 or 4, may be disposed randomly or blockwise within the polyoxyalkylene blocks, but distribution in individual blocks is preferred.

The subscript y indicates the total number of oxyalkylene units.

Polysiloxane block B corresponds to the average formula

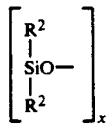

The number of these difunctional units is determined by the subscript x, which has a value of 10 to 100 and preferably 15 to 70.

Within the polysiloxane block, the $R^2$ groups may be the same or different and may be an alkyl group with 1 to 4 carbon atoms or a phenyl group Examples of $R^2$ groups are methyl, ethyl, propyl, n-butyl and i-butyl groups; however, at least 90% of the $R^2$ groups should be methyl groups. Those polysiloxane blocks are preferred in which all the $R^2$ groups are methyl groups.

$R^1$ groups may be the same or different within the average molecule. The $R^1$ end groups are hydrogen or alkyl groups with 1 to 4 carbon atoms. Preferably, $R^1$ is a hydrogen atom. If $R^1$ is an alkyl group, the butyl group is preferred.

Of particular importance for the characterization of the block copolymer that is to be used according to the invention is the subscript m, which has a value of 4 to 20 and preferably of 4 to 15. As is evident from the comparison examples, there is good reason for assuming that the value of m is of decisive importance from the fact that the block copolymers that are to be used pursuant to the invention have excellent antifoaming properties, but at the same time do not cause any wetting defects when dispersions of vehicles, coating agents or adhesives containing defoamer are applied.

In accordance with the state of the art, it is possible to add up to 20% by weight of inorganic or organic finely divided solids to the polyoxyalkylene-polysiloxane block copolymers that are to be used according to the invention. Examples of inorganic solids are optionally hydrophobized silica, aluminum oxide, alkaline earth carbonates or similar finely divided solids, known from and customary in the art. As organic, finely divided substances for this purpose, known alkaline earth salts of long-chain fatty acids with 12 to 22 carbon atoms or the amides of these fatty acids can be used. Additional suitable organic solids are derivatives of urea, which may be obtained by the reaction between isocyanates and amines.

The block copolymers that are to be used pursuant to the invention may be used as such or in the form of aqueous dispersions. The use of dispersions is preferred, however, because the possibilities of metering them are better. More particularly, aqueous dispersions containing 5 to 50% by weight of block copolymers are used.

The defoamers of the invention are used in amounts of 0.01 to 2% by weight and especially in amounts of 0.1 to 1% by weight, based on the dispersion to be defoamed.

Examples of polyoxyalkylene-polysiloxane block copolymers, which are to be used in the inventive process and which are especially suitable, include

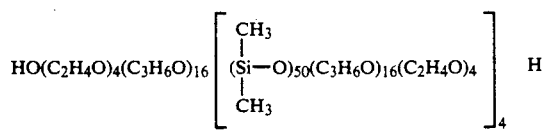

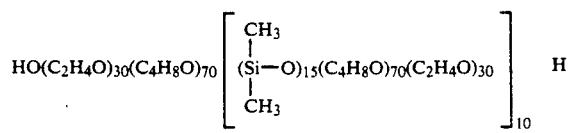

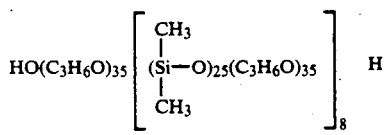

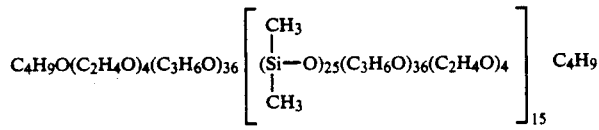

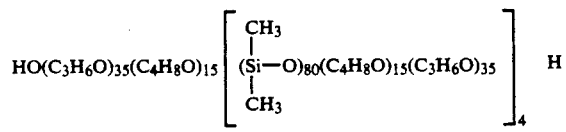

In the following examples, the application and properties of the polyoxyalkylene-polysiloxane block copolymers used according to the invention are explained in even greater detail and compared with the properties of products of the state of the art. While the following examples of the invention further illustrate the best mode currently contemplated for carrying out the invention, the illustrative examples must not be construed as limiting the invention in any manner.

EXAMPLES

Preparation of Polymers According to the Invention

To a 2 liter three-necked flask with stirrer, distillation bridge and gas inlet tube, 712 g of a polyoxyalkylene (A) (OH number=50, n=2.9) are transferred and mixed with the same amount of toluene. After distilling off approximately 200 g of toluene to dry the polyoxyalkylene azeotropically, the solution is cooled to 75° C., the distillation bridge is exchanged for a dropping funnel and 288 g. of an $\alpha,\omega$-dichlorodimethylpolysiloxane (B) (x=15) are added dropwise over a period of 30 minutes. After a post-reaction period of 1 hour at 80° C., the solution is neutralized with ammonia. The ammonium chloride is then filtered off and the product is free from solvent.

The reaction product obtained corresponds to the general formula,

HO—A—[BA]$_4$H      I

The products,

HO—A—[BA]$_8$H      II

HO—A—[BA]$_{10}$H      III

HO—A—[BA]$_{15}$H      IV are produced in an analogous manner.

Products I to IV are converted into a 20% aqueous dispersion without additional disperse silica using nonionic emulsifiers (polyoxyethylene fatty alcohol ether, polyoxyethylene fatty acid triglyceride with an HLB value of 13).

Tests of the Polymers According to the Invention

To test the defoaming action of the products used according to the invention in comparison with that of known, state of the art products, a stirring test is carried out. For this purpose, 100 g. of a polymer dispersion to be defoamed are weighed into a 250 ml. beaker and stirred for 1 minute at 2500 rpm with a turbine covered at the top. Immediately after the stirring, 50 ml. of the polymer dispersion are transferred to a calibrated measuring flask and weighed. The volume of air absorbed can then be calculated from the equation:

$$\text{volume percent air} = 100 - 2G_R/\gamma$$

in which $G_R$ is the weight of the stirred polymer dispersion and $\gamma$ is the density of the unstirred polymer dispersion. In addition, a 200 μm (wet) thick layer of defoamer-containing and stirred polymer dispersion is applied with a doctor blade on a PVC film. The dried polymer film is evaluated for wetting defects.

The polymer dispersions A to N of the state of the art (conventional commercial products), which are employed to determine the characteristics of polymer dispersions containing the defoaming agents according to the invention, are based on polyurethanes and find applications as adhesives, textile and leather coating materials and as vehicles. In each case, 0.1% of the inventive polymers are used for the testing.

TABLE 1

| | COMPARATIVE DEFOAMERS (not of the invention) | | | | | | | |
|---|---|---|---|---|---|---|---|---|
| | Without Defoamer | | Comparison 1 according to OLS 2,442,853 | | Comparison 2 according to USP 4,028,218 | | Comparison 3 according to OLS 3,123,103 | |
| Polymer Dispersion | vol % Air | Wetting Defects | vol % Air | Wetting Defects | vol % Air | Wetting Defects | vol % Air | Wetting Defects |
| A | 34.5 | none | 2.1 | severe | 2.5 | severe | 18.0 | severe |
| B | 30.7 | none | 2.5 | severe | 5.9 | isolated | 6.8 | severe |
| C | 12.4 | none | 0.2 | severe | 2.3 | severe | 7.0 | severe |
| D | 13.5 | none | 0.8 | severe | 3.7 | severe | 6.7 | severe |

TABLE 1-continued

| | COMPARATIVE DEFOAMERS (not of the invention) | | | | | | | |
|---|---|---|---|---|---|---|---|---|
| | Without Defoamer | | Comparison 1 according to OLS 2,442,853 | | Comparison 2 according to USP 4,028,218 | | Comparison 3 according to OLS 3,123,103 | |
| Polymer Dispersion | vol % Air | Wetting Defects | vol % Air | Wetting Defects | vol % Air | Wetting Defects | vol % Air | Wetting Defects |
| E | 11.2 | none | 0.7 | severe | 1.5 | severe | 2.9 | severe |
| F | 28.0 | none | 1.8 | severe | 18.6 | severe | 17.5 | none |
| G | 21.5 | none | 1.6 | severe | 3.5 | severe | 4.3 | severe |
| H | 9.1 | none | 1.0 | severe | 4.1 | none | 1.9 | severe |
| K | 15.7 | none | 1.3 | severe | 4.4 | severe | 3.4 | severe |
| L | 24.6 | none | 3.1 | severe | 18.1 | severe | 9.0 | isolated |
| M | 41.2 | none | 2.4 | severe | 12.9 | severe | 10.2 | severe |
| N | 18.6 | none | 2.3 | severe | 5.8 | severe | 8.1 | severe |

TABLE 2

| | DEFOAMERS OF THE INVENTION | | | | | | | |
|---|---|---|---|---|---|---|---|---|
| | I | | II | | III | | IV | |
| Polymer Dispersion | vol % Air | Wetting Defects | vol % Air | Wetting Defects | vol % Air | Wetting Defects | vol % Air | Wetting Defects |
| A | 2.7 | none | 1.9 | none | 2.0 | none | 2.6 | none |
| B | 3.4 | none | 1.8 | none | 2.7 | none | 2.2 | none |
| C | 0.6 | none | 0.7 | none | 0.5 | none | 0.6 | none |
| D | 0.6 | none | 0.8 | none | 0.9 | none | 0.8 | none |
| E | 0.1 | none | 0.2 | none | 0.1 | none | 0.1 | none |
| F | 3.0 | none | 2.6 | none | 2.9 | none | 2.7 | none |
| G | 2.3 | none | 2.1 | none | 2.1 | none | 2.0 | none |
| H | 1.5 | none | 1.7 | none | 1.6 | none | 1.7 | none |
| K | 1.9 | none | 1.9 | none | 1.5 | none | 1.8 | none |
| L | 2.5 | none | 2.3 | none | 2.7 | none | 2.8 | none |
| M | 3.4 | none | 3.1 | none | 3.0 | none | 2.9 | none |
| N | 1.9 | none | 2.0 | none | 2.1 | none | 2.1 | none |

We claim:

1. A defoaming agent comprising a polyoxyalkylene-polysiloxane block copolymer of the formula, $$R^1O-A-[B-A-]_mR^1$$

wherein

A is a polyoxyalkylene block with the average formula $(C_nH_{2n}O-)_y$, in which n has a value of 2.8 to 4.0 and y a value of 15 to 100, B is a polysiloxane block of the average formula,

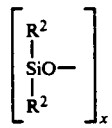

wherein the $R^2$ groups are the same or different and represent an alkyl group with 1 to 4 carbon atoms or a phenyl group, with the proviso that at least 90% of the $R^2$ groups are methyl groups and x has a value of 10 to 100, $R^1$ groups are the same or different and represents a hydrogen atom or an alkyl group with 1 to 4 carbon atoms and m has a value of 4 to 20.

2. The defoaming agent according to claim 1, in which in the formula of the polyoxyalkylene-polysiloxane block copolymer:

$R^1$ is a hydrogen atom,
$R^2$ is a methyl group,
n=2.8 to 3.5, m=4 to 15 and x=15 to 70.

3. The defoaming agent according to claim 1, in which the polyoxyalkylene blocks A are comprised of different oxyalkylene units, wherein the value of n for each individual oxyalkylene unit=2, 3 or 4, disposed blockwise in the polyoxyalkylene blocks of the polyoxyalkylene-polysiloxane block copolymer.

4. The defoaming agent according to claim 1, which comprises the polyoxyalkylene-polysiloxane block copolymer in admixture with up to 20% by weight of inorganic or organic finely divided solid, based on the weight of the block copolymer.

5. The defoaming agent according to claim 1, in which the polyoxyalkylene-polysiloxane block copolymer is in the form of an aqueous dispersion.

6. The defoaming agent according to claim 1, in which the polyoxyalkylene-polysiloxane block copolymer is in the form of an aqueous dispersion containing about 5 to 50% by weight of polyoxyalkylene-polysiloxane block copolymer.

7. The defoaming agent according to claim 1, which comprises the polyoxyalkylene-polysiloxane block copolymer in admixture with up to 20% by weight, based on the weight of the block copolymer, of inorganic or organic finely divided solid, selected from the group consisting of silica, aluminum oxide, alkaline earth carbonate, alkaline earth salt of a fatty acid having 12 to 22 carbon atoms, amide of a fatty acid having 12 to 22 carbon atoms and a urea obtained by the reaction between an isocyanate and an amine.

8. The defoaming agent according to claim 1, which comprises the polyoxyalkylene-polysiloxane block copolymer in admixture with up to 20% by weight, based on the weight of the block copolymer, of finely divided solid selected from silica and aluminum oxide.

* * * * *